(12) United States Patent
Coffey et al.

(10) Patent No.: US 6,830,443 B1
(45) Date of Patent: Dec. 14, 2004

(54) MOLDING APPARATUS FOR MINIMIZING FLASH ON SEALING FILTER GASKET

(75) Inventors: Bruce E. Coffey, Charlotte, NC (US); Roland V. Lanier, Jr., Belmont, NC (US)

(73) Assignee: Dana Corporation, Toledo, OH (US)

( * ) Notice: Subject to any disclaimer, the term of this patent is extended or adjusted under 35 U.S.C. 154(b) by 87 days.

(21) Appl. No.: 10/274,269

(22) Filed: Oct. 21, 2002

(51) Int. Cl.[7] .......................... B29C 45/14; B29C 70/76
(52) U.S. Cl. ...................... 425/116; 425/812; 264/252; 264/DIG. 48; 249/95
(58) Field of Search ................................ 425/116, 117, 425/125, 812; 249/83, 95, 141; 264/252, DIG. 48

(56) References Cited

U.S. PATENT DOCUMENTS

| 3,183,285 A | * | 5/1965 | Boylan ................. 264/DIG. 48 |
| 3,397,518 A | * | 8/1968 | Arthur ........................... 55/502 |
| 3,408,438 A | * | 10/1968 | Staunton ..................... 264/252 |
| 3,807,146 A | | 4/1974 | Witkowski ................... 55/502 |
| 4,830,804 A | | 5/1989 | Weaver ....................... 264/139 |
| 4,957,672 A | | 9/1990 | Carter et al. ......... 264/DIG. 48 |
| 5,106,397 A | | 4/1992 | Jaroszczyk et al. ........... 55/502 |
| 5,431,872 A | | 7/1995 | Sink ............................ 264/161 |
| 5,529,476 A | * | 6/1996 | Borasio et al. ............. 425/116 |
| 5,660,771 A | | 8/1997 | Dunfee et al. ....... 264/DIG. 48 |
| 5,935,481 A | | 8/1999 | Dunfee et al. ................ 249/95 |
| 6,270,704 B1 | | 8/2001 | Bates et al. ................ 264/46.4 |

FOREIGN PATENT DOCUMENTS

| JP | 56-130205 A | 10/1981 |
| JP | 2-9847 B2 | 3/1990 |

* cited by examiner

*Primary Examiner*—Robert B. Davis
(74) *Attorney, Agent, or Firm*—Liniak, Berenato & White

(57) ABSTRACT

In order to prevent the formation of flash and air bubbles on a gasket used to seal a filter element when the filter element is mounted in a housing to filter a fluid, a molding apparatus comprises first and second mold components cooperating to define a mold cavity positioned around the filter media formed by their respective mold surfaces and adapted to receive an expandable material forming the sealing gasket. The mold cavity includes a substantially semi-spherical ridge portion having an apex. The ridge portion of the mold cavity is formed by both the first and second mold components abutting each other at the apex of the ridge portion of the mold cavity along a mold line oriented at an angle to a central axis of symmetry of the mold apparatus. Moreover, mold surfaces of the mold components have upwardly sloping ramp surfaces for preventing trapped air bubbles.

20 Claims, 8 Drawing Sheets

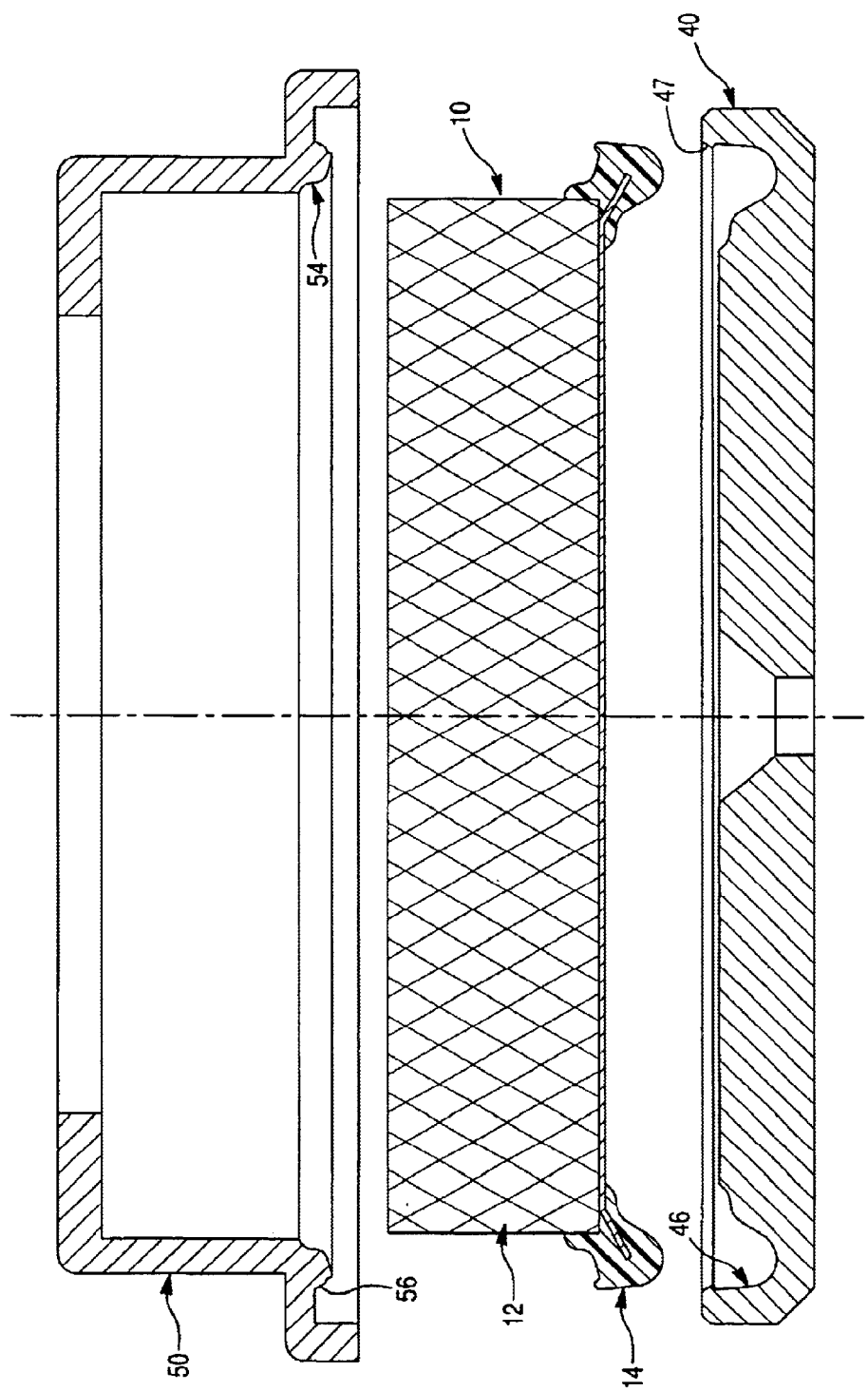

MOLDING APPARATUS FOR MINIMIZING FLASH ON SEALING FILTER GASKET

BACKGROUND OF THE INVENTION

1. Field of the Invention

The present invention relates to an improved molding process and apparatus. More particularly, the present invention relates to an improved molding process and apparatus for molding a gasket to a filter element.

2. Description of the Prior Art

Rectangular or cylindrical filter elements used in filter assemblies for filtering fluids, such as ambient air, are frequently configured with a rectangular or cylindrical filter media in which fluid being filtered passes axially or radially through the filter media either from, or to, a hollow central core which is plugged at one end. In order to appropriately mount the filter media within a filter housing of the filter assembly, the filter media is frequently provided with a radially projecting, gasket for sealing the filter media with respect to inlet and outlet openings of the filter housing.

A conventional practice in forming the sealing gasket of the filter elements is to expand within a mold cavity foamable material such as polyurethane produced by a mixture of polyol and isocyanate. When using this process, the expanding material produces flash between upper and lower mold halves. The flash must be trimmed and vacuumed off prior to sale of the filter element; otherwise, the flash may become dislodged during installation or operation. If the flash is sucked against the filter media, the media's efficiency is reduced. There is also the chance of loose flash being transferred into the engine or other machine on which the filter employing the media is installed and meant to protect.

Another difficulty which arises when forming such annular seals is the occurrence of pits or other discontinuities in the surface of the gasket due to air or other gas bubbles being trapped as the material from which the gasket is formed expands into engagement with the surface of the top mold. In addition to presenting an unfinished appearance, these defects can on occasion result in a leaking seal which can allow at least small debris to be sucked around the gasket into the engine. In addition, the strength of the gasket may be compromised if large air bubbles are trapped in the foam material as it expands.

SUMMARY OF THE INVENTION

The present invention provides a new and improved molding apparatus for forming a sealing gasket on a filter media. The molding apparatus comprises of a first, or bottom, mold component and a second, or top, mold component each provided with a corresponding mold surface. The first and second mold components are substantially rectangular in cross section and cooperate to define a mold cavity positioned around a filter media formed by their respective mold surfaces and adapted to receive an expandable material forming the sealing gasket.

The mold cavity includes a substantially semi-spherical ridge portion having an apex. The ridge portion defines a rib of the sealing gasket of the filter element. The ridge portion of the mold cavity is formed by both the first and second mold components abutting each other at the apex of the ridge portion of the mold cavity along a mold line oriented at an angle to a central axis of symmetry of the mold apparatus. Moreover, the mold surfaces of the mold components have upwardly sloping ramp surfaces.

The sealing gasket is formed by molding the expandable material in the mold cavity defined by first and second mold components. As the material expands, a portion of the material is accumulated in the ridge portion of the mold cavity while allowing the residual gas and air remaining after the expansion of the expandable material escape between the first mold component and the second mold component as they meet at the apex of the ridge portion along the inclined mold line, thus eliminating a peripheral flash formed on the sealing gasket which must subsequently be trimmed.

Furthermore, the invention provides venting the cavity through the filter media as the gasket forming material expands in a way that air and gas in the mold cavity does not become trapped in the media and form blemishes and discontinuities on an outer surface of the sealing gasket. The effectiveness of the venting step is enhanced by providing the upwardly sloping ramp surfaces in the first and second mold components adjacent to the location of the filter media which define a surface which assists in conveying air and gas from the mold cavity and through the filter media as the material expands within the mold cavity to form the sealing gasket. Thus, chances are minimized that the sealing gasket will have imperfections or blemishes therein.

Preferably, the material for forming the sealing gasket is open foam polyurethane formed by mixing polyol and isocyanate. However, any other appropriate resilient material known in the art is within the scope of the present invention.

Therefore, the molding apparatus in accordance with the present invention provides a filter element with a sealing gasket free of the peripheral flash, imperfections and blemishes.

Upon further study of the specification and appended claims, further features and advantages of this invention will become apparent to those skilled in the art.

BRIEF DESCRIPTION OF THE DRAWINGS

Other objects and advantages of the invention will become apparent from a study of the following specification when viewed in light of the accompanying drawings, wherein:

FIG. 11 is an exploded side elevation showing the completed filter element being separated from the molding apparatus.

DETAILED DESCRIPTION OF PREFERRED EMBODIMENTS

Figure 1:
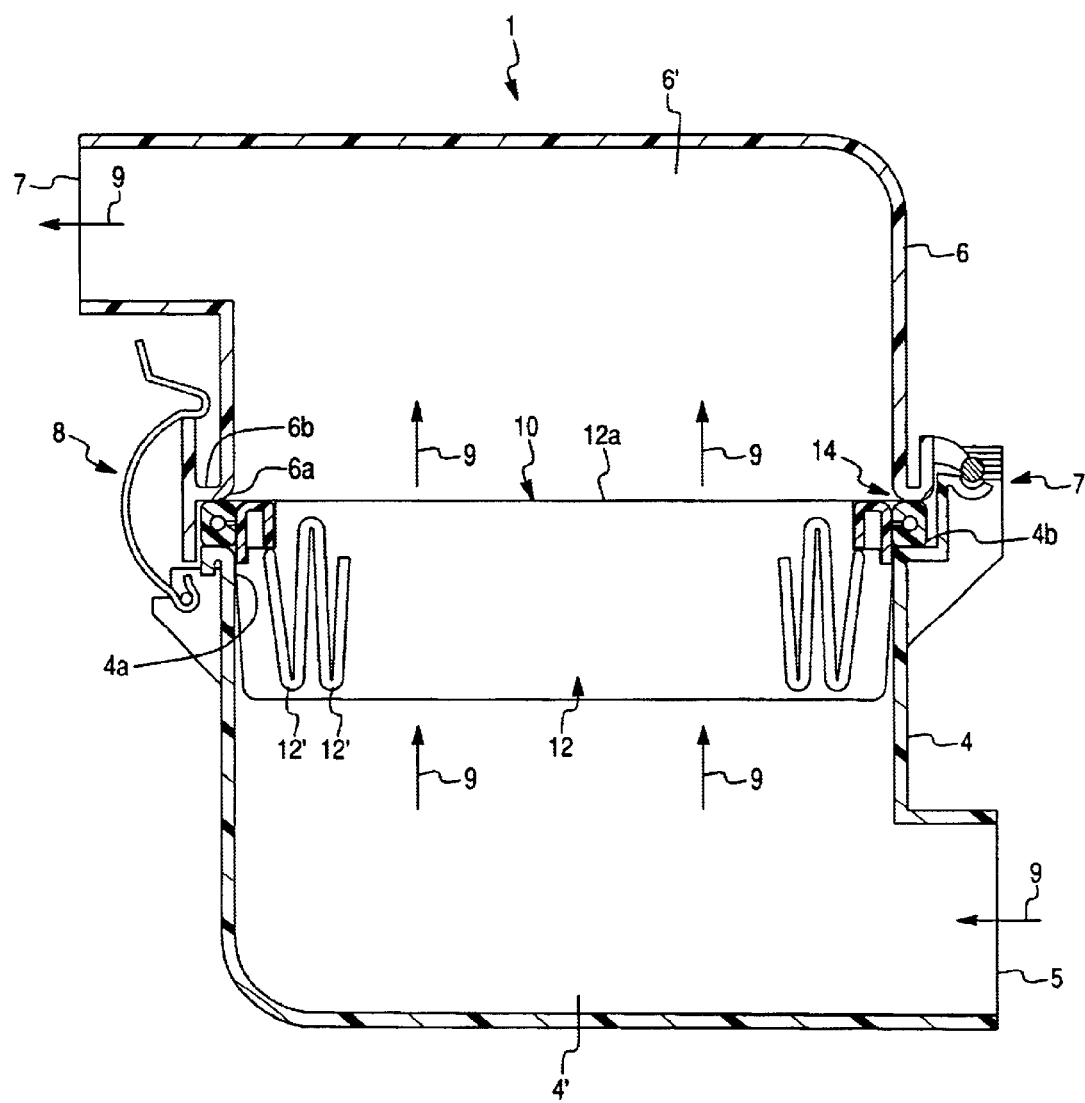
FIG. 1 is a sectional view of an air filter assembly with an air filter element having a gasket formed in accordance with the principles of the present invention.
Figure 2:
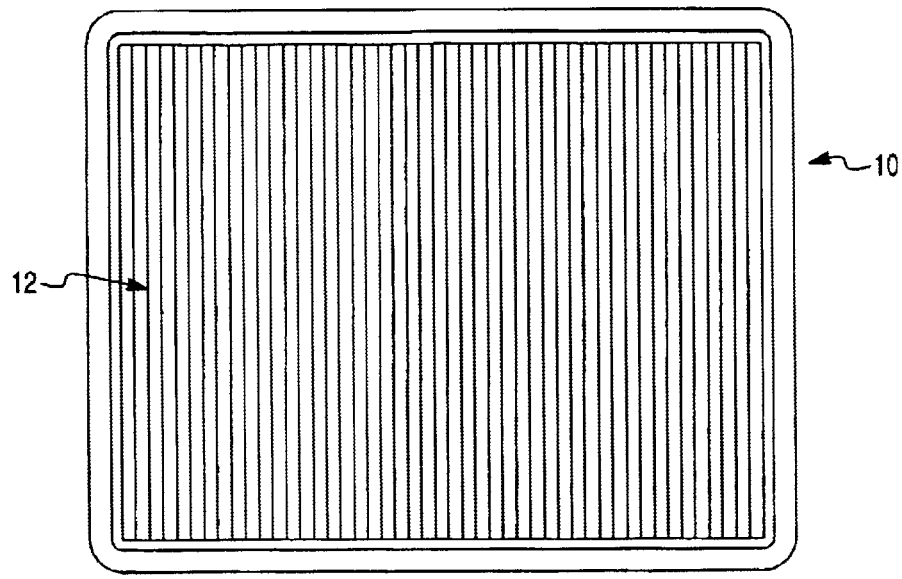
FIG. 2 is a top view of the filter element of the present invention.
Figure 3:
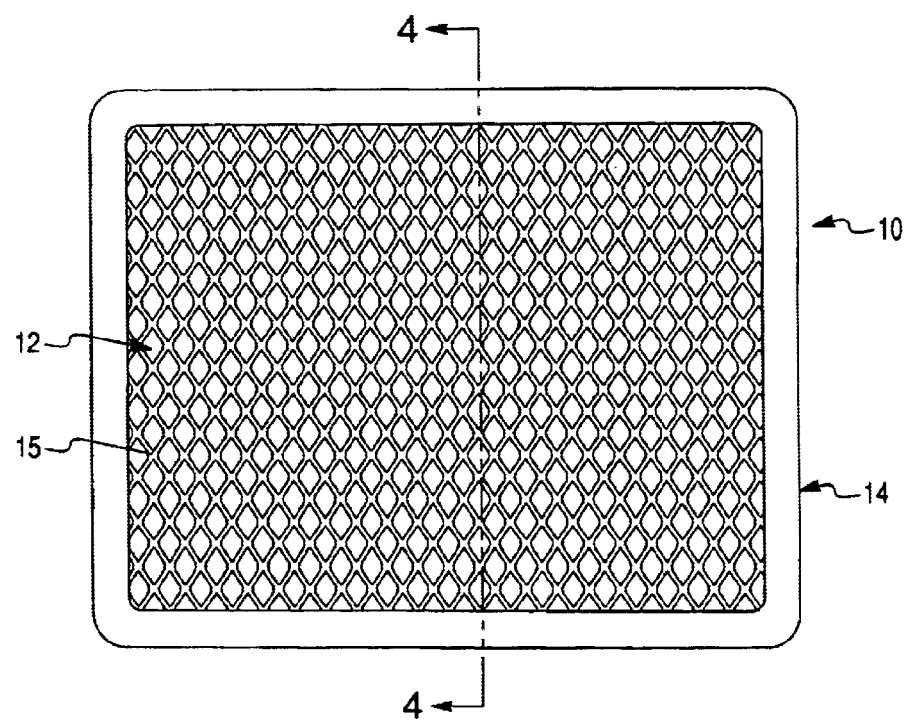
FIG. 3 is a bottom view of the filter element of the present invention.
Figure 4:
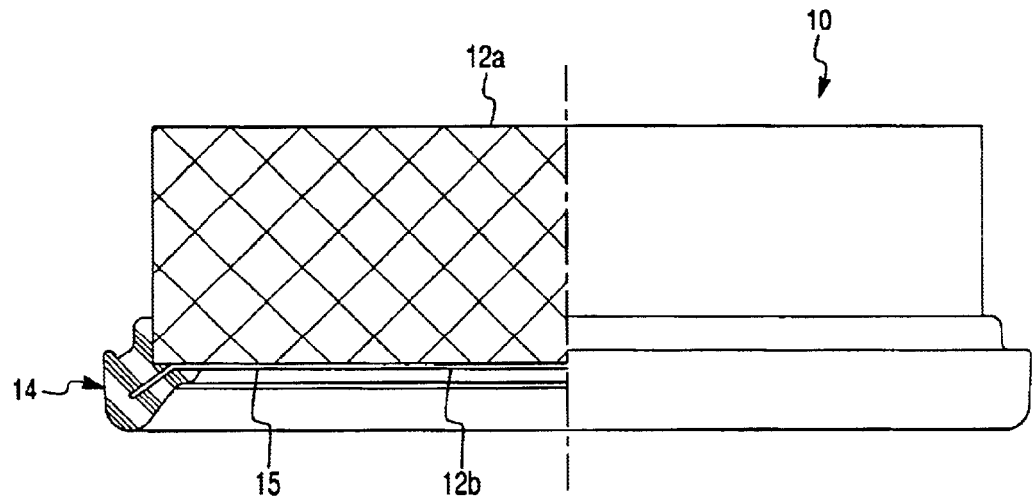
FIG. 4 is a cross sectional view of the filter element of the present invention.

The preferred embodiment of the present invention will now be described with the reference to accompanying drawings.

Referring first to FIGS. 1–4, an air filter element 10 adapted to be employed in an air filter assembly 1 for cleaning intake air entering an internal combustion engine of a motor vehicle, is illustrated. As illustrated in detail in FIGS. 2–4, the air filter element 10 comprises a filter media 12 having substantially planar, rectangular, box-shaped configuration, defining an upstream side 12a and a downstream side 12b. Disposed on a downstream side of the pleated filter media 12 is a planar metal screen 15 of light weight metal, such as aluminum, providing support for the filter media 12. The air filter element 10 further comprises a circumferential sealing gasket 14 provided on and around a periphery of the downstream side 12b of the filter media 12. However, it is to be understood that while the present invention is described in relation to the rectangular air filter element, the present invention is equally suitable for use in other types of the fluid filter elements, such as air or oil filter elements having cylindrically, annularly or frusto-conically shaped filter media.

The air filter element 10 is adapted to be secured inside a filter housing 2 in any appropriate manner well known to those skilled in the art. In the exemplary embodiment, illustrated in FIG. 1, the filter housing 2 includes a case or first housing 4 having an air inlet 5 and a first opening 4a, a cap or second housing 6 having an air outlet 7 and a second opening 6a. The filter element 10 is accommodated in the case 4. A pair of hinge devices 7 are provided on one of opposite side surfaces of the air filter housing 2 (right side surface as seen in FIG. 1), and a pair of clamping devices 8 are provided on the other side surface of the filter housing 2 (left side surface as seen in FIG. 1). The case 4 has a first flange 4b formed throughout the entire periphery of the first opening 4a, while the cap 6 has a second flange 6b formed throughout the entire periphery of the second opening 6a. The first and second flanges 4b and 6b, respectively, are opposed to each other when the case 4 and the cap 6 are assembled together. This first and second flanges 4b and 6b are complementary to the sealing gasket 14 of the filter media 12.

With the case 4 and the cap 6 assembled together, the sealing gasket 14 is interposed and clamped between the first flange 4b of the case 4 and the second flange 6b of the cap 6. The sealing gasket 14 acts to position the air filter media 12 within filter housing 2 and becomes sealingly engaged between the case 4 and the cap 6.

In the illustrated in FIG. 1 embodiment, the air filter element 10 separates a raw air space 4' from a clean air space 6' defined within the filter housing 2. The sealing gasket 14 functions to inhibit the air flow 9 which flows from the raw air space 4' defined by the case 4 and the filter element 10 toward the clean air space 6' defined by the cap 6 and the filter element 10 without passing through the filter media 12. The sealing gasket 14 further prevents the ambient air from flowing into the clean air space 6' from the outside of the filter housing 2. The filter element 10 filters ambient air entering the filter housing 2 through the raw air inlet 5 which flows axially through the filter media 12 in the direction of arrows 9 and after cleaning leaves the air filter housing 2 through the clean air outlet 7. Typically, the filter media 12 traps particles entrained in the fluid stream on the filter media and the cleaned fluid flows out of the filter assembly 1 through the clean air outlet 7 of the filter assembly 1.

The air filter of the exemplary embodiment of the present invention is particularly suitable for the air intake of an internal combustion engine and is advantageously arranged in the engine compartment of a motor vehicle or in the immediate vicinity of an internal combustion engine. In the illustrated embodiment, the fluid being filtered flows axially upwardly; however, in some arrangements, the fluid flows axially downwardly, or radially inwardly or outwardly. While in the illustrated embodiment the fluid being filtered is air, the invention has relevance to filters filtering other gases or liquids. For example, the fluid being filtered may be lubricating oil or hydraulic fluid.

Preferably, the filter media 12 comprises a pleated paper type filtering material, such as phenolic paper (T-33). Other suitable materials may be used for filter media 12 such as natural and synthetic fabric pleated material including nylon, polyester, cotton, etc. The filter media 12 is folded in a manner to define a series of circumferentially arranged and axially extending pleats 12'.

The sealing gasket 14 secures downstream ends of pleats 12' of the filter media 12. The sealing gasket 14 is formed in-situ about the filter media 12. Preferably, the sealing gasket 14 is made of polyurethane foam. It will be appreciated that any other suitable material, such as urethane or ethylene-propylenediene modified rubber, is within the scope of the present invention.

Figure 5:
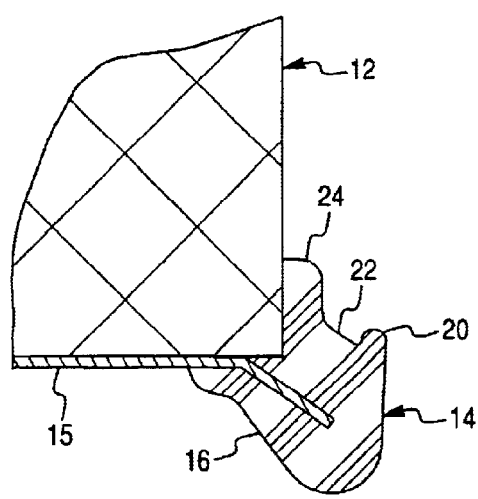
FIG. 5 is a partial sectional view of the filter element showing an enlarged cross-section of a sealing gasket of the present invention.

A illustrated in detail in FIG. 5, the sealing gasket 14 has a downstream tapered portion 16, a substantially semi-cylindrical rib 20 (substantially semi-spherical in cross-section) extending around the periphery of the downstream side 12b of the filter media 12, and an upstream tapered portion 22 which slopes positively with respect to a bead 24 from the rib 20.

The air filter element 10 is manufactured by forming a planar rectangle of pleated filter material defining the filter media 12. The filter media 12 is placed in a mold used to form the sealing gasket 14. The downstream end of pleats 12' are spaced slightly above a mold bottom. A polyurethane material is poured into the mold and allowed to cure about pleats 12'.

It is important that the sealing gasket 14 not have large gas bubbles therein, and it is especially important that a sealing surface of the sealing gasket 14 be free of blemishes which might compromise the integrity of the seal formed by clamping the sealing gasket 14 between the case 4 and the cap 6 of the filter housing 2. It is also important that when the sealing gasket 14 is sold or used that flashing not be present because the flashing can become dislodged and impinged against the filter media 12 or even it can enter machinery (such as the internal combustion engine) being protected and possibly cause damage. Prior to the present invention, the flashing was trimmed and then vacuumed away to avoid these hazards. With the present invention, no flashing occurs.

Figure 6:
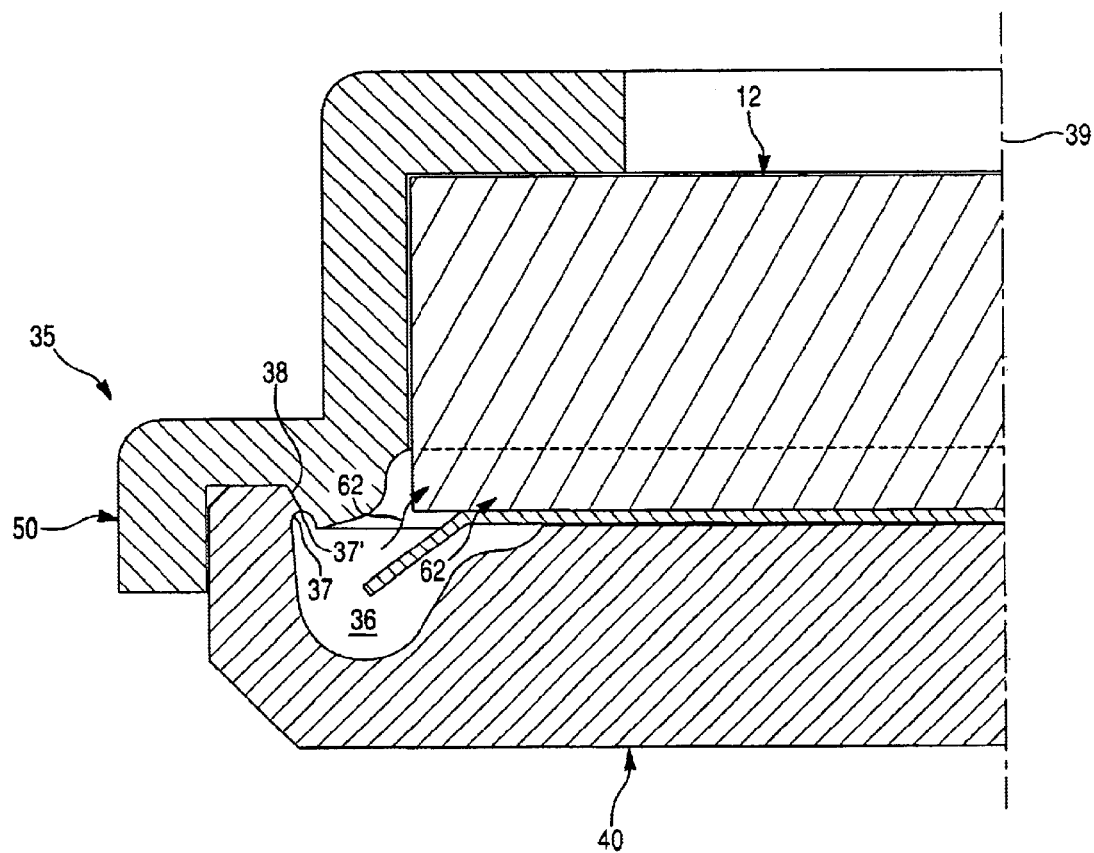
FIG. 6 is a partial sectional view of a molding apparatus in accordance with the resent invention.

Referring now to FIGS. 6–11, there is shown a molding apparatus 35 in accordance with the preferred embodiment of the present invention. As is seen in FIG. 6 illustrating the molding apparatus 35 in a closed position, the filter media 12 is placed in the molding apparatus 35 so that the sealing gasket 14 may be molded around the filter media 12. The molding apparatus 35 comprises of a first, or bottom, mold component 40 and a second, or top, mold component 50, and has a central axis 39. The first and second mold components 40 and 50 are substantially rectangular in cross section and cooperate to form a mold cavity 36 which extends radially with respect to a substantially rectangular chamber 51 in the second mold component 50. The rectangular chamber 51 being configured to conform to the shape of the filter media 12. Aligned with the mold cavity 36 is an exposed portion 17 of the filter media 12, against which exposed portion the sealing gasket 14 abuts.

Figure 7:
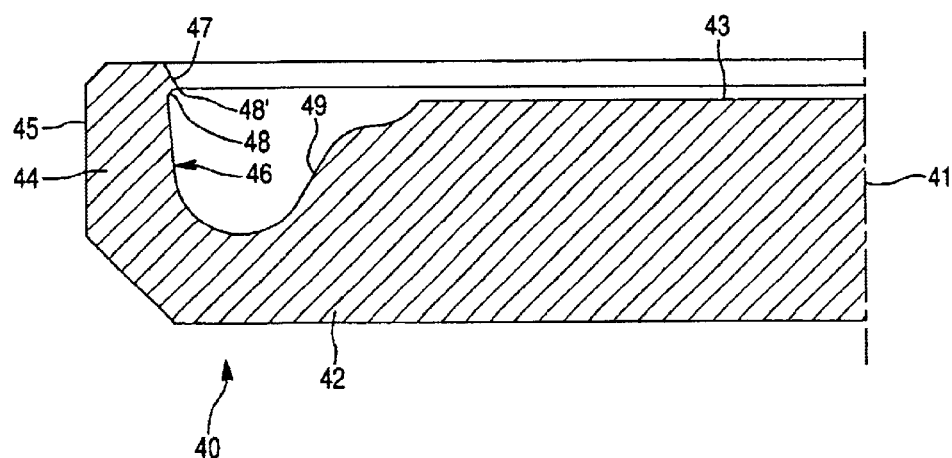
FIG. 7 is a partial sectional view of a first mold component of the molding apparatus in accordance with the present invention.
Figure 8:
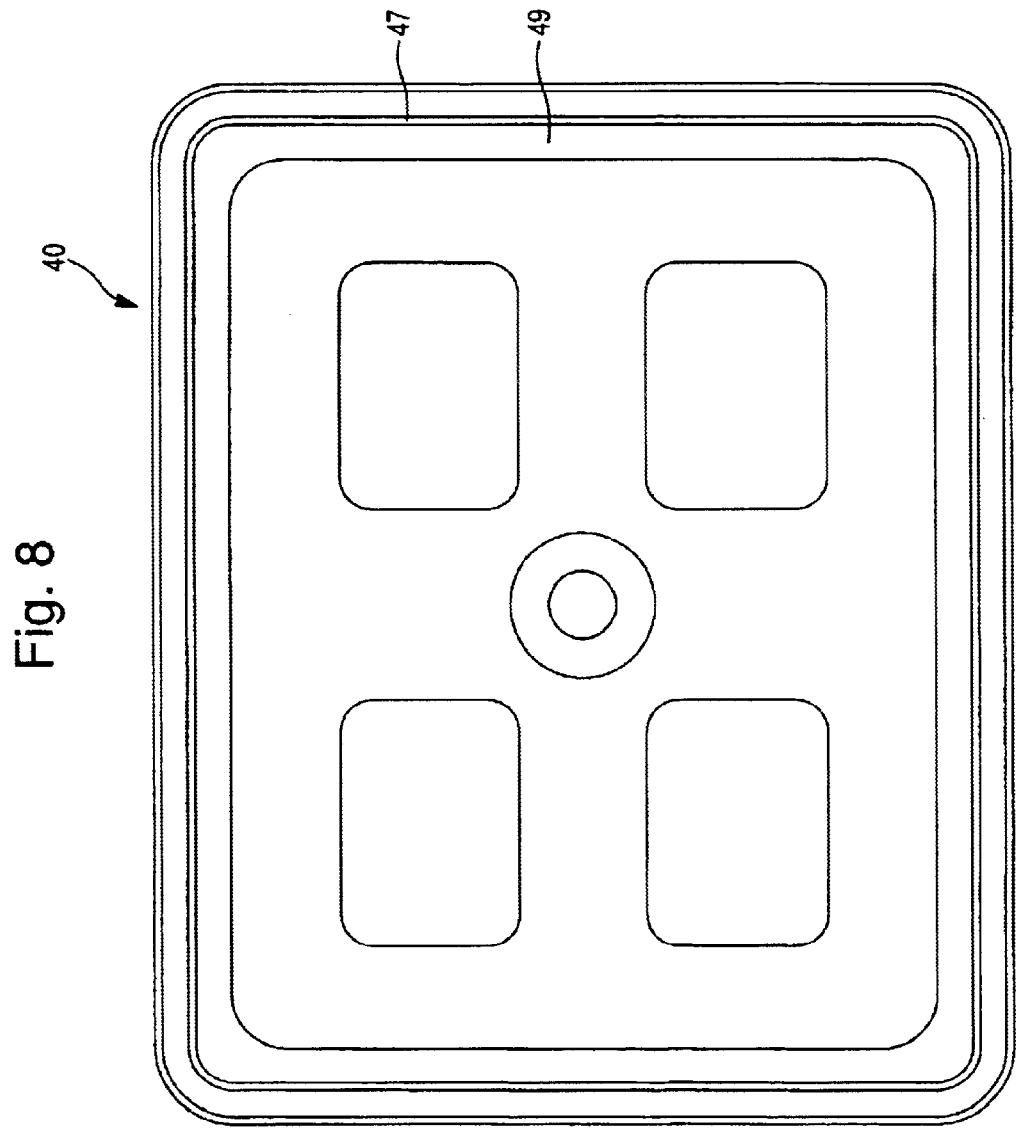
FIG. 8 is a top view of a first mold component of the molding apparatus in accordance with the present invention.

As illustrated in detail in FIGS. 7 and 8, the first mold component 40 has a first central axis 41 coaxial with the central axis 39 of the molding apparatus 35, and includes a substantially rectangular plate portion 42 with an axial opening 67 therethrough, and a peripheral wall 44 that extends substantially upwardly and axially from the plate portion 42. The plate portion 42 has a support surface 43 provided to hold the filter media 12. The peripheral wall 44 has a first outer surface 47 and a first mold surface 46. The first mold surface 46 has a upwardly sloping ramp surface 49 forming the downstream tapered portion 16 of the sealing gasket 14.

Figure 9:
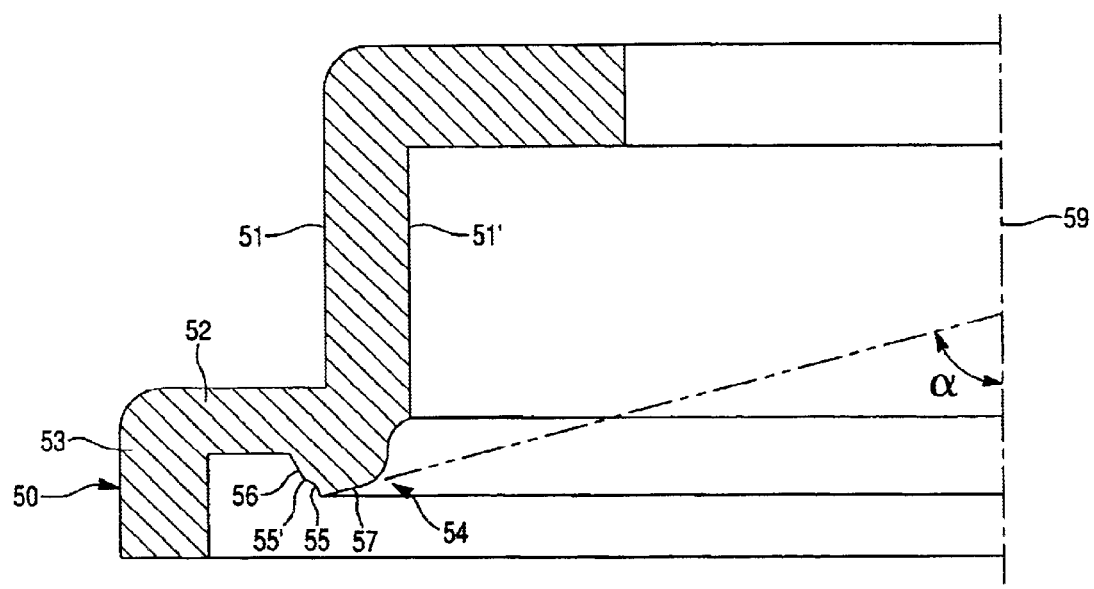
FIG. 9 is a partial sectional view of a second mold component of the molding apparatus in accordance with the present invention.
Figure 10:
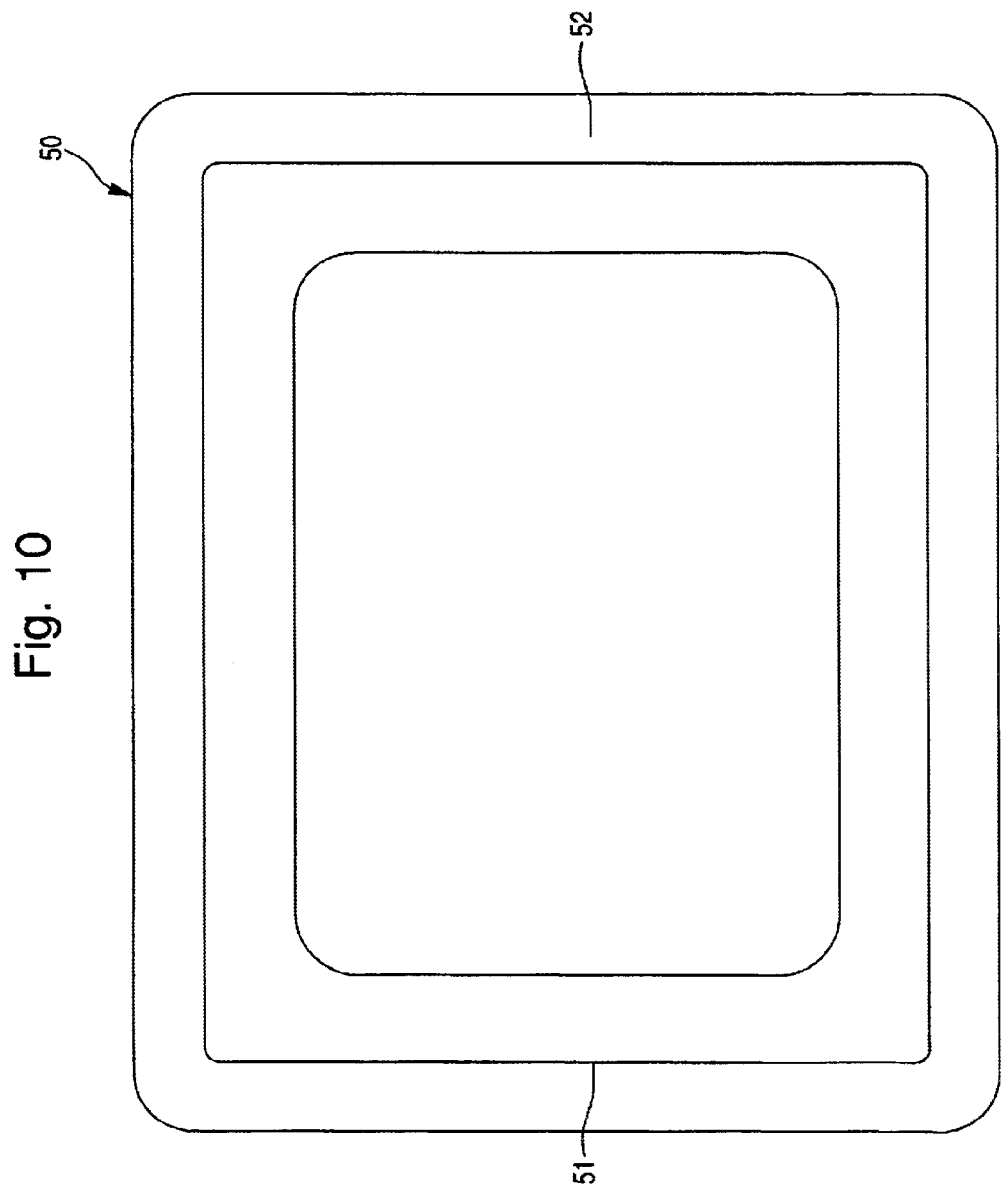
FIG. 10 is a top view of a second mold component of the molding apparatus in accordance with the present invention.

As illustrated in detail in FIGS. 9 and 10, the second mold component 50 has a second central axis 59 coaxial with the central axis 39 of the molding apparatus 35, and includes a box portion 51 with an inner surface 51' which conforms to the shape of the filter media 12 and a flange portion 52. As the filter media 12 is rectangular in cross-section, then the inner surface 51' is also rectangular in cross-section. However, if the filter media 12 is cylindrical or frustoconical, then the inner surface 51' may also be cylindrical or frustoconical. The flange portion 52 extends radially outwardly from the box portion 51 of the second mold component 50 and has a rectangular lip portion 53 which fits over the peripheral wall 44 of the first mold component 40. The flange portion 52 of the second mold component 50 has a second mold surface 54 and an outer surface 56 which abuts with the outer surface 47 of the peripheral wall 44 to form a substantially frustoconical surface referred to in the art as a mold line 38. The second mold surface 54 has a ramp surface 57 sloping upwardly (or in a positive direction with respect to the second central axis 59 second mold component 50) and forming the upstream tapered portion 22 of the sealing gasket 14. That shape may vary for different types of seals and may have a substantially flat surface as seen on the FIGS. 6 and 9, or concave or convex surfaces (not shown). Preferably, the ramp surface 57 is substantially flat and is oriented at an angle α equal to approximately 75° to the second central axis 59 of the second mold component 50. It would be appreciated by those skilled in the art, that the ramp surface 57 may be oriented relative to the second central axis 59 at any other appropriate angle that would provide easy escape of the residual gas and air from the mold cavity 36.

Moreover, as illustrated in FIG. 6, the mold line 38 is not perpendicular to the central axis 39 of the molding apparatus 35. Preferably, the angle between the mold line 38 and the central axis 39 is approximately 30°. However, it would be appreciated that the mold line 38 may be oriented relative to the central axis 39 at any appropriate angle, other than 90°, such as in a range from 10° to 50°, or the mold line 38 may be parallel to the central axis 39. Preferably, as shown in FIG. 6, the mold line 38 is inclined upwardly away from the central axis 39. Alternatively, the mold line 38 may be inclined upwardly toward the central axis 39.

As further illustrated in FIG. 6, the mold cavity 36 is formed within the cooperating first and second mold surfaces 46 and 54 of the first and second mold components 40 and 50, respectively. As yet further illustrated in FIG. 6, the mold cavity 36 includes a substantially semi-cylindrical ridge portion 37 (substantially semi-spherical in cross-section) having an apex 37'. The ridge portion 37 defines the rib 20 of the sealing gasket 14 of the filter element 10. The ridge portion 37 of the mold cavity 36 is formed by both the first and second mold components 40 and 50. For this purpose, the first mold component 40 includes a first ridge portion 48 that ends at a point marked 48', while the second mold component 50 includes a second ridge portion 55 that ends at a point marked 55'. When the molding apparatus 35 is closed, the first and second mold components 40 and 50 cooperate so that the point 48' of the first mold surface 46 coincides with the point 55' of the second mold surface 54 substantially at the apex 37' of the ridge portion 37 of the mold cavity 36.

In order to form the sealing gasket 14, a quantity of open pour polyurethane is deposited within the mold cavity 36 the molding apparatus 35. The open pour polyurethane is a mixture of polyol and isocyanate which combine in an exerthermic process to produce polyurethane foam. During the reaction, carbon dioxide is released as the mixture reacts and expands.

As the polyol and isocyanate mixture expands to form foamed polyurethane, pressure in the mold cavity 36 rises both because carbon dioxide is generated and air in the cavity is compressed. The carbon dioxide and air are expelled in the direction of arrows 62 (FIG. 6). The air and gas pass through the filter media 12. As the polyol and isocyanate react, the mold cavity 36 is filled with gas and air which moves up the sloping ramp surface 57. By providing the upwardly sloping ramp surfaces 49 and 57, chances are minimized that air or gas will become trapped within the mold cavity 36 between the first and second mold surfaces 46 and 54 and an outer peripheral surface of the sealing gasket 14 during the molding process. Thus, chances are minimized that the sealing gasket 14 will have imperfections or blemishes therein.

In order to prevent flashing from forming at the mold line 38, while still allowing the sealing gasket 14 to expand radially a sufficient distance, the polyurethane foam formed by the expanding mixture flows into the ridge portion 37 formed by the first and second mold surfaces 46 and 54 of the first and second molding components 40 and 50, which abut each other substantially at the apex 37' of the ridge portion 37 forming the mold line 38 oriented at the angle to the central axis 39. The polyurethane which accumulates in the ridge portion 37 forms the rib 20 (shown in FIG. 5) which does not need to be trimmed from the sealing gasket 14. As is seen in FIG. 6, the ridge portion 37 has sufficient volume to accommodate the rib 20 and residual gas and air remaining after the expansion of the mixture escape between the outer surface 47 of the first mold component 40 and the outer surface 56 of the second mold component 50 as they meet substantially at the apex 37' of the ridge portion 37 at the angle to the central axis 39 to form the inclined mold line 38. It would be appreciated by those skilled in the art, that the mold line 38 may be oriented relative to the central axis 39 at any appropriate angle other than 90°, that would provide easy escape of the residual gas and air from the mold cavity 36. Because of such an arrangement of the mold cavity 36, no peripheral flash is formed on the sealing gasket 14, so there is no need to employ an operator to trim the flash and vacuum it away.

Complete sealing gasket 14 is fully formed on the filter media 12, thus forming the filter element 10 within the molding apparatus 35. As is seen in FIG. 9, when the first and second components 40 and 50 are separated from one another, the filter element 10 is provided with the sealing gasket 14 having no peripheral flash.

It is emphasized that while the above described apparatus 35 is used to produce the air filter elements 10 for internal combustion engines, the concepts disclosed herein may be used for other types of filters which have gaskets, the quality of which is diminished by mold line flashing and surface blemishes and defects due to air and gas trapped during molding.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A molding apparatus provided for forming a sealing gasket solidified from an expandable material on one side of a filter media, said molding apparatus comprising:
   a first mold component having a first central axis substantially coaxial with a central axis of said molding apparatus and including a plate portion with a substantially axially extending peripheral wall, said peripheral wall having a first outer surface and a first mold surface; and
   a second mold component having a second central axis substantially coaxial with said first central axis of said first mold component, said second mold component including a flange portion having a second outer surface and a second mold surface;
   said first mold surface of said first mold component adapted to cooperate with said second mold surface of said second mold component to define a mold cavity into which said material may expand to form said sealing gasket, said mold cavity having a ridge portion;
   said first outer surface of said first mold component abutting said second outer surface of said second mold component substantially at an apex of said ridge portion.

2. The molding apparatus as defined in claim 1, wherein said first outer surface of said first mold component abuts said second outer surface of said second mold component along a mold line oriented at an angle other than 90° to said central axis.

3. The molding apparatus as defined in claim 1, wherein said angle at which said mold line is oriented to said central axis is approximately 30°.

4. The molding apparatus as defined in claim 1, wherein said filter media being substantially rectangular in configuration.

5. The molding apparatus as defined in claim 1, wherein said filter media includes a planar, pleated paper type filtering material.

6. The molding apparatus as defined in claim 1, wherein said first and second mold components being substantially rectangular in configuration.

7. The molding apparatus as defined in claim 1, wherein said second mold surface of said second mold component further includes a ramp surface sloped positively toward said filter media in an upward direction when said filter media is installed in said molding apparatus, whereby as said expandable material fills said mold cavity, air and gas in said mold cavity move along said ramp surface and through said filter media to prevent imperfections in said sealing gasket due to air and gas being trapped in said mold cavity as said sealing gasket is being formed.

8. The molding apparatus as defined in claim 7, wherein said ramp surface of said second mold surface of said second mold component is substantially flat and is oriented at an angle of approximately 75° to said second central axis of the second mold component.

9. The molding apparatus as defined in claim 1, wherein said first mold surface of first mold component further includes a ramp surface sloped positively toward said filter media in an upward direction when said filter media is installed in said molding apparatus, whereby as said expandable material fills said mold cavity, air and gas in said mold cavity move along said ramp surface and through said filter media to prevent imperfections in said sealing gasket due to air and gas being trapped in said mold cavity as said sealing gasket is being formed.

10. The molding apparatus as defined in claim 1, wherein said expandable material is a polyurethane.

11. A molding apparatus provided for forming a sealing gasket solidified from an expandable material on one side of a filter media, said molding apparatus comprising:
    a first mold component having a first axis of symmetry substantially coaxial with a central axis of said molding apparatus and including a plate portion with a substantially axially extending peripheral wall, said peripheral wall having a first outer surface and a first mold surface; and
    a second mold component coaxial with said first mold component, said second mold component having a flange portion, said flange portion having a second outer surface and a second mold surface;
    said first mold surface of said first mold component adapted to cooperate with said second mold surface of said second mold component to define a mold cavity into which said material may expand to form said sealing gasket, said mold cavity having a ridge portion;
    said first outer surface of said first mold component abuts said second outer surface of said second mold component along a mold line that is not perpendicular to said central axis.

12. The molding apparatus as defined in claim 11, wherein said mold line is oriented to said central axis at an angle of approximately 30°.

13. The molding apparatus as defined in claim 11, wherein said first outer surface of said first mold component abutting said second outer surface of said second mold component substantially at an apex of said ridge portion.

14. The molding apparatus as defined in claim 1, wherein said filter media being substantially rectangular in configuration.

15. The molding apparatus as defined in claim 11, wherein said filter media includes a planar, pleated paper type filtering material.

16. The molding apparatus as defined in claim 1, wherein said first and second mold components being substantially rectangular in configuration.

17. The molding apparatus as defined in claim 11, wherein said second mold surface of said second mold component further includes a ramp surface sloped positively toward said filter media in an upward direction when said filter media is installed in said molding apparatus, whereby as said expandable material fills said mold cavity, air and gas in said mold cavity move along said ramp surface and through said filter media to prevent imperfections in said sealing gasket due to air and gas being trapped in said mold cavity as said sealing gasket is being formed.

18. The molding apparatus as defined in claim 10, wherein said first mold surface of first mold component further includes a ramp surface sloped positively toward said filter media in an upward direction when said filter media is installed in said molding apparatus, whereby as said expandable material fills said mold cavity, air and gas in said mold cavity move along said ramp surface and through said filter media to prevent imperfections in said sealing gasket due to air and gas being trapped in said mold cavity as said sealing gasket is being formed.

19. The molding apparatus as defined in claim 11, wherein said expandable material is a polyurethane.

20. A molding apparatus provided for forming a sealing gasket solidified from an expandable material on one side of a filter media, said molding apparatus comprising:

a first mold component having a first axis of symmetry substantially coaxial with a central axis of said molding apparatus and including a plate portion with a substantially axially extending peripheral wall, said peripheral wall having a first outer surface and a first mold surface, said first mold component being substantially rectangular in configuration; and a second mold component coaxial with said first mold component, said second mold component having a flange portion, said flange portion having a second outer surface and a second mold surface, said second mold component being substantially rectangular in configuration;

said first mold surface of said first mold component adapted to cooperate with said second mold surface of said second mold component to define a mold cavity into which said material may expand to form said sealing gasket, said mold cavity having a ridge portion;

said first outer surface of said first mold component abutting said second outer surface of said second mold component substantially at an apex of said ridge portion;

said first outer surface of said first mold component abuts said second outer surface of said second mold component along a mold line oriented at an angle of approximately 30° to said central axis;

said filter media including a planar, pleated paper type filtering material being substantially rectangular in configuration;

wherein each of said first mold surface of first second mold component and said second mold surface of said second mold component further includes a substantially flat ramp surface sloped positively toward said filter media in an upward direction when said filter media is installed in said molding apparatus, whereby as said expandable material fills said mold cavity, air and gas in said mold cavity move along said ramp surface and through said filter media to prevent imperfections in said sealing gasket due to air and gas being trapped in said mold cavity as said sealing gasket is being formed;

wherein said ramp surface of said second mold surface of said second mold component is oriented at an angle of approximately 75° to said second central axis of the second mold component; and wherein said expandable material is a polyurethane.

* * * * *